United States Patent [19]

Kanda

[11] Patent Number: 5,408,337
[45] Date of Patent: Apr. 18, 1995

[54] REDUCTION OF MOIRE BY ADAPTIVELY SELECTING A SMOOTHING FILTER FOR SMOOTHING HALFTONE IMAGE PORTIONS, BASED ON EVALUATION OF BLOCKS OF TRANSFORMATION FACTORS RESULTING FROM DISCRETE COSINE TRANSFORMED PIXEL DATA BLOCKS

[75] Inventor: Yoshimichi Kanda, Kawasaki, Japan

[73] Assignee: Ricoh Company, Ltd., Tokyo, Japan

[21] Appl. No.: 160,795

[22] Filed: Dec. 3, 1993

[30] Foreign Application Priority Data

Dec. 7, 1992 [JP] Japan ..................... 4-326790

[51] Int. Cl.⁶ ............ H04N 1/40; H04N 1/38; G06K 9/40; G06K 9/36
[52] U.S. Cl. ................... 358/447; 355/445; 355/463; 355/462; 355/467; 355/457; 355/456; 355/464; 355/433; 355/455; 382/22; 382/54; 382/56
[58] Field of Search ............ 358/447, 448, 462, 467, 358/457, 456, 464, 433, 455, 445, 463; 382/56, 22, 54

[56] References Cited

U.S. PATENT DOCUMENTS

| | | | |
|---|---|---|---|
| 5,287,200 | 2/1994 | Sullivan et al. | 358/433 |
| 5,359,676 | 10/1994 | Fan | 382/56 |
| 5,371,611 | 12/1994 | Kato et al. | 358/456 |

Primary Examiner—Edward Coles, Sr.
Assistant Examiner—Allan A. Esposo
Attorney, Agent, or Firm—Popham, Haik, Schnobrich & Kaufman, Ltd.

[57] ABSTRACT

An image processing apparatus in which a moiré occurring in a half tone area can be eliminated by a suitable filter. A plurality of data blocks comprising N*N pixel data are transformed by means of a two-dimensional orthogonal transform so as to obtain an N*N matrix transformation factor block. An evaluation block is prepared which comprises N*N transformation factors each of which is the mean value of the absolute values of corresponding factors from a data block being considered and data blocks surrounding the data block to be determined. Mean values A[i] and B[i] (i=0 to L−1) of predetermined transformation factors are calculated, A[i] being mean values of factors included in a number L of first areas consecutively positioned along a diagonal line of the evaluation block, B[i] being mean values of factors included in a number L of second areas positioned adjacent to and lower in frequency to the corresponding first areas. A filter selection signal is generated which corresponds to the number i when a condition is satisfied where A[i]>B[i] and A[i]>threshold value th1. The pixel data corresponding to the evaluation block is smoothed by the selected filter.

9 Claims, 12 Drawing Sheets

FIG.8A

| 1 | 2 | 2 | 2 | 1 |
|---|---|---|---|---|
| 2 | 2 | 2 | 2 | 2 |
| 1 | 2 | 2 | 2 | 1 |

| 1 | 2 | 2 | 2 | 1 |
|---|---|---|---|---|
| 2 | 3 | 3 | 3 | 2 |
| 1 | 2 | 2 | 2 | 1 |

| 1 | 2 | 2 | 2 | 1 |
|---|---|---|---|---|
| 2 | 4 | 4 | 4 | 2 |
| 1 | 2 | 2 | 2 | 1 |

| 1 | 2 | 2 | 2 | 1 |
|---|---|---|---|---|
| 2 | 5 | 5 | 5 | 2 |
| 1 | 2 | 2 | 2 | 1 |

| 1 | 2 | 2 | 2 | 1 |
|---|---|---|---|---|
| 2 | 6 | 6 | 6 | 2 |
| 1 | 2 | 2 | 2 | 1 |

| LINE NUMBER DETERMINING VALUE | NUMBER OF LINES | FILTER SESECTION SIGNAL |
|---|---|---|
| k < 0.90 | 85 | 0 |
| 0.9 ≦ k < 1.47 | 100 | 1 |
| 1.47 ≦ k < 1.94 | 120 | 2 |
| 1.94 ≦ k < 2.20 | 133 | 3 |
| 2.20 ≦ k < 2.90 | 150 | 4 |
| 2.90 ≦ k < 3.53 | 175 | 5 |
| 3.53 ≦ k | 200 | 6 |

REDUCTION OF MOIRE BY ADAPTIVELY SELECTING A SMOOTHING FILTER FOR SMOOTHING HALFTONE IMAGE PORTIONS, BASED ON EVALUATION OF BLOCKS OF TRANSFORMATION FACTORS RESULTING FROM DISCRETE COSINE TRANSFORMED PIXEL DATA BLOCKS

BACKGROUND OF THE INVENTION

The present invention relates to an image processing apparatus which optimally processes image information of an original read by a scanner in accordance with the image characteristics thereof.

In image forming apparatuses such as copy machines, an image is read by an image reading unit as a digital signal, and the digital signal is supplied to a recording unit so as to obtain a reproduced image on a hard copy. In such an image reading unit, an original is read out by an image sensor such as a CCD (Charge Coupled Device) image sensor by dividing the image into small areas, that is, pixels. An analog electric signal obtained by the image sensor is converted into a digital signal, and then various image processing operations are applied to the digital signal so as to obtain optimum image data in accordance with the image characteristics thereof.

In this type of image forming apparatus, an original is read out by a line sensor or the like having a small pixel size. Accordingly, when intensity change of the original image has periodicity such as in a half tone image, there is a possibility of formation of moiré in a recorded image due to interference of the periodicity of the intensity change of the original image with the pitch of the image sensor arranged in the line sensor, that is, the sampling period. This moiré can be eliminated by suppressing the periodicity of the intensity change through a plurality of pixels by averaging the intensity of the pixels.

However, when intensities of a plurality of pixels are averaged to eliminate a moiré, the resultant character image or continuous-tone image may be undesirably blurred. Therefore, there is a problem in that when a mesh image and a character image or a continuous-tone image are mixed in one original image, the averaging process must be applied only to the mesh image area.

SUMMARY OF THE INVENTION

It is a general object of the present invention to provide an improved and useful image forming apparatus in which the above-mentioned problems are eliminated.

A more specific object of the present invention is to provide an image forming apparatus which optimally processes image information of an original in accordance with the image characteristics thereof.

In order to achieve the above-mentioned object, according to the present invention, there is provided an image processing apparatus which processes pixel data obtained from an original containing a half tone image, comprising:

data block preparing means for preparing a plurality of data blocks comprising N*N pixel data obtained by scanning of the original;

smoothing means for smoothing the pixel data by using one of a plurality of filters provided therein;

transform means for transforming each of the data blocks by means of a two-dimensional orthogonal transform so as to obtain a transformation factor block corresponding to each of the data blocks in the form of an N*N matrix;

evaluation block preparing means for preparing an evaluation block comprising N*N transformation factors each of which is a mean value of the absolute values of corresponding factors from a data block being considered and data blocks surrounding the data block being considered;

mean value calculating means for calculating mean values A[i] and B[i] (i=0 to L−1) of predetermined transformation factors in the evaluation block, the mean values A[i] being mean values of transformation factors included in a number L of first areas consecutively positioned along a diagonal line of the evaluation block extending from lower factors to higher factors, the mean values B[i] being mean values of transformation factors included in a number L of second areas positioned adjacent to and lower in frequency to the corresponding first area;

filter selection signal generating means for generating a filter selection signal which corresponds to the number i when a condition is satisfied where the mean value A[i] is greater than B[i] and is greater than a predetermined threshold value th1; and filter selection means for selecting one of the filters in the smoothing means in accordance with the filter selection signal supplied by the filter selection signal generating means so that the pixel data corresponding to the evaluation block is smoothed by the selected filter.

According to the above-mentioned image processing apparatus according to the present invention, since the pixel data corresponding to a half tone area is smoothed by a selected suitable filter in accordance with a frequency component of the intensity waveform of the half tone area, a moiré occurring in the half tone area can be effectively eliminated.

Other objects, features and advantages of the present invention will become more apparent from the following detailed description when read in conjunction with the accompanying drawings.

BRIEF DESCRIPTION OF THE DRAWINGS

FIGS. 8A, 8B, 8C, 8D and 8E are illustrations for explaining characteristics of a plurality of filters in a filter processing unit of FIG. 2;

FIG. 9 is an illustration for explaining a line number conversion table in a variation of the first embodiment;

DETAILED DESCRIPTION OF THE PREFERRED EMBODIMENTS

A description will now be given, with reference to FIGS. 1 through 8, of a first embodiment of the present invention. In this embodiment, image data is processed so that a discrete cosine transform (DCT) method, which is an orthogonal transform using cosine functions, is applied to each block comprising 8*8=64 pixels. A filter is selected in accordance with a characteristic pattern of DCT factors of a half tone, and the half tone area is then submitted to a filtering process.

A description will now be given, with reference to FIG. 1, of a general structure of a copy machine to which an image processing apparatus of the first embodiment according to the present invention is applied. An original image is scanned line by line and converted into an analog signal by an image reading unit 101. The analog signal is then converted into a digital signal by an A/D converter 102. An image processing unit 103 applies a smoothing process to the digital signal only for a part corresponding to a half tone area of the original image, and outputs the digital signal to an image recording unit 104.

Figure 1:
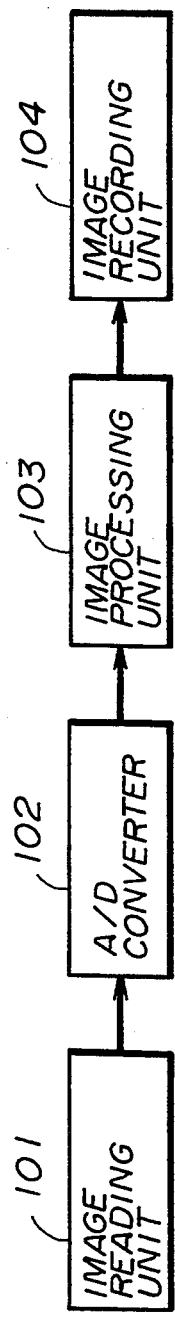
FIG. 1 is a block diagram showing a general structure of a copy machine to which an image processing apparatus of a first embodiment according to the present invention is applied.

In the image processing unit 103 shown in FIG. 1, the image data signal, converted by the A/D converter 102 and corresponding to 8 lines of pixels, is stored in areas corresponding to lines from a third line to a tenth line of a 10-line memory unit 201. When new data for 8 lines is written into the 10-line memory unit 201, the area corresponding to the first and second lines of the 10-line memory unit 201 is written with data corresponding to the previous ninth and tenth lines.

This is because, as described below, a filter selecting unit 202 processes the image data signal in blocks of 8*8 pixels, and a filter processing unit 203 requires data corresponding to lines immediately before and after the 8 lines so as to process the data by using a 5*3 matrix filter.

Data to be written in an area corresponding to lines from the second to the ninth line of the 10-line memory unit 201 is supplied to the filter selecting unit 202. The filter selecting unit 202 selects a filter from among filters provided in the filter processing unit 203 in accordance with each block consisting of 8*8 pixels, and supplies a filter selection signal i to the filter processing unit 203. The filter processing unit 203 processes the image data signal using one of the filters shown in FIGS. 8A to 8E, in accordance with the signal i supplied by the filter selecting unit 202, and the processed image data signal is output to the image recording unit 104 shown in FIG. 1.

Figure 3:
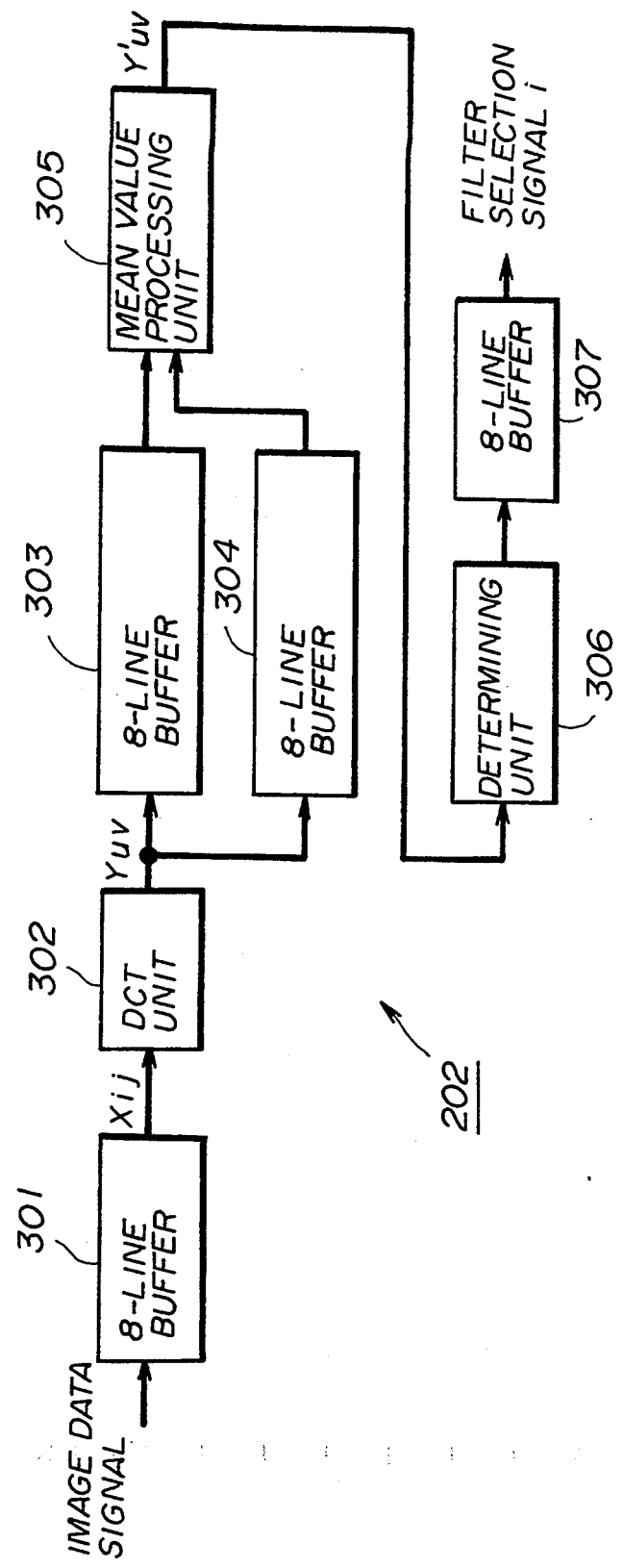
FIG. 3 is a block diagram of a filter selecting unit of FIG. 2.

As shown in FIG. 3, in the filter selecting unit 202, data corresponding to 8 lines is stored first in an 8-line buffer 301, and the data is then converted into a DCT factor $Y_{uv}$ by a DCT unit for each block consisting of 8*8 pixels.

Figure 4:
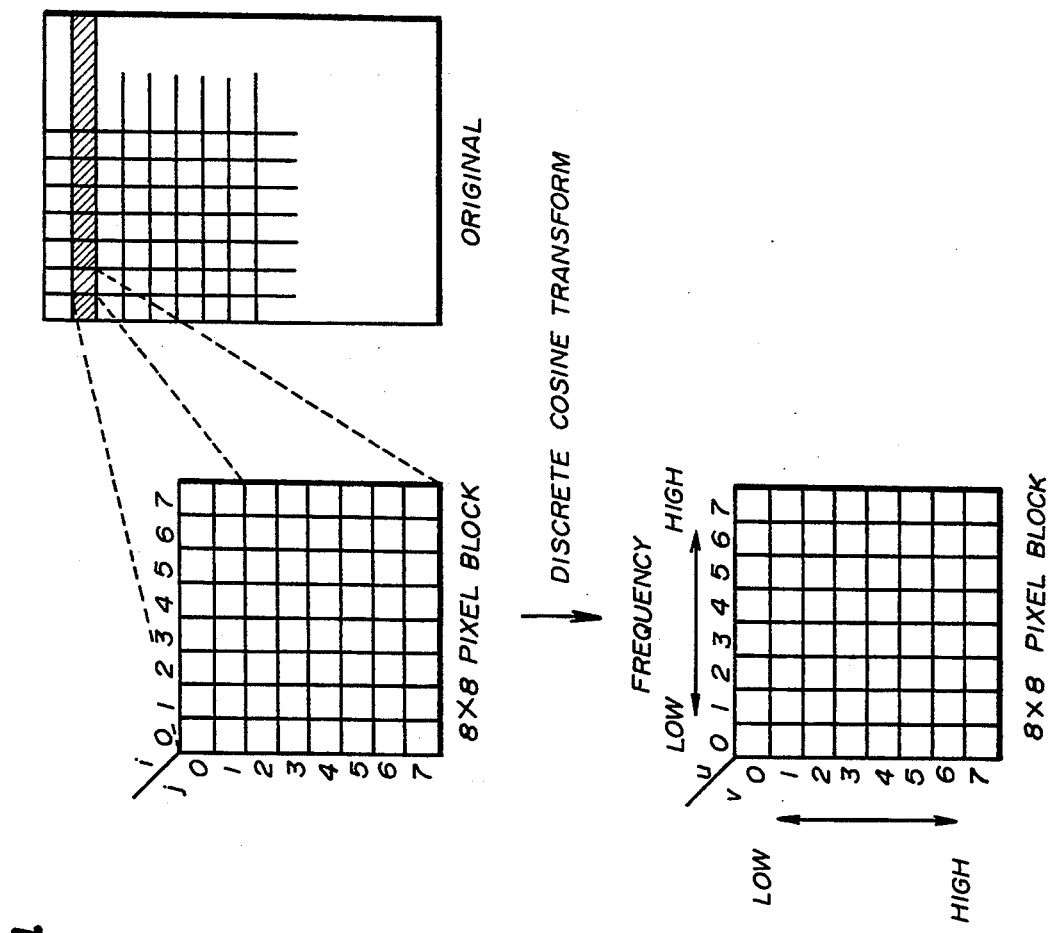
FIG. 4 is an illustration for explaining a DCT process performed by a DCT processing unit of FIG. 3.

FIG. 4 is an illustration for explaining the DCT process performed by the DCT unit 302. The DCT process is performed in accordance with the following equation:

$$Y_{uv} = \frac{2C(u)C(v)}{N} \sum_{i=0}^{\eta} \sum_{j=0}^{\eta} X_{ij} \cos\left[\frac{(2i+1)u\pi}{2 \cdot N}\right] \cdot \cos\left[\frac{(2j+1)v\pi}{2 \cdot N}\right]$$

where,

N is equal to 8;

u and v are 0 to 7; and $C(w)$ is $2^{-\frac{1}{2}}$ when $w=0$, and $C(w)$ is 1 when $w=1-7$.

In the above equation, $X_{ij}$ is a value representing the intensity of a pixel, and $Y_{uv}$ is a value representing a DCT factor obtained after the DCT is applied. Additionally, the DCT factor $Y_{00}$ is called the DC component, and represents the average intensity of the pixels in the block consisting of 8*8 pixels. The other factors $Y_{uv}$ are called AC components, and represent magnitudes of frequency components of the intensity waveform corresponding to the block; a greater u or v value indicates a higher-frequency component.

The DCT factors $Y_{uv}$ obtained by the DCT unit 302 are alternately stored in B-line buffers 303 and 304 for each 8 lines. After both of the 8-line buffers 303 and 304 are supplied with complete data corresponding to 8 lines, the data is output to a mean value processing unit 305. The mean value processing unit 305 obtains a mean value $Y'_{uv}$ in accordance with the absolute values of the DCT factors $Y_{uv}$ of surrounding blocks. A determining unit 306 determines whether or not the block being considered corresponds to a half tone area by using evaluation blocks explained below.

Figure 5:
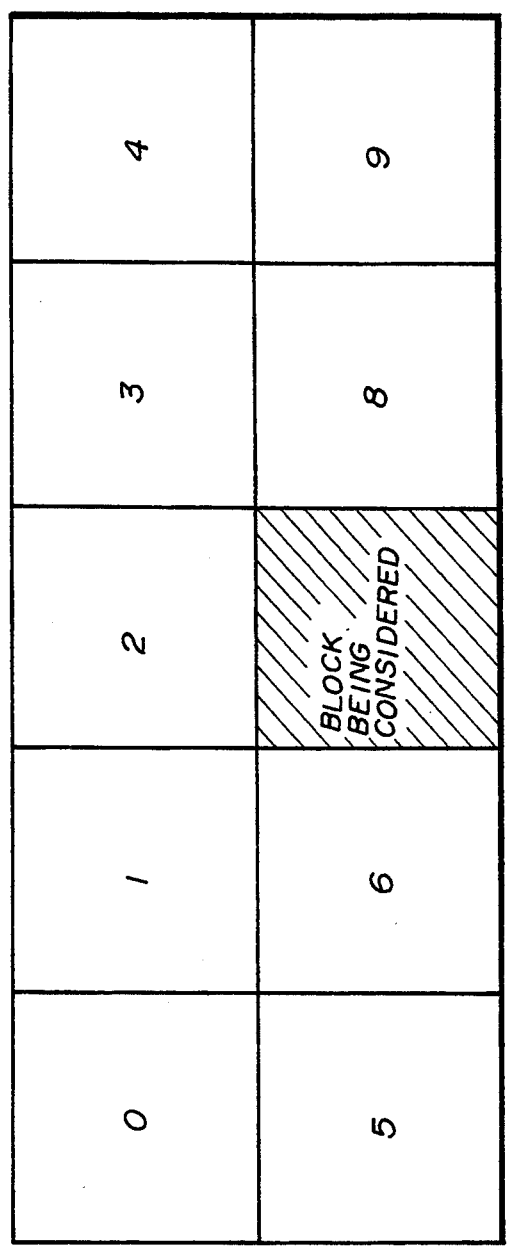
FIG. 5 is an illustration for explaining a method for determining evaluation blocks of a mesh area.

A description will now be given, with reference to FIG. 5, of a determining method for the evaluation blocks. In this embodiment, a mean value $Y'_{uv}$ of absolute values for 10 blocks is obtained, which 10 blocks are comprised of a first row of 5 blocks having the block being considered positioned in the center and a second row of 5 blocks positioned above the first 5 blocks. The mean value of the factor component $Y'_{uv}$ is obtained according to the following equation:

$$Y_{uv} = \left( \sum_{i=0}^{9} |Y[i]_{uv}| \right) / 10$$

Where $Y[i]_{uv}$ is a DCT factor in each block (i is a block number shown in FIG. 5).

Figure 6B:
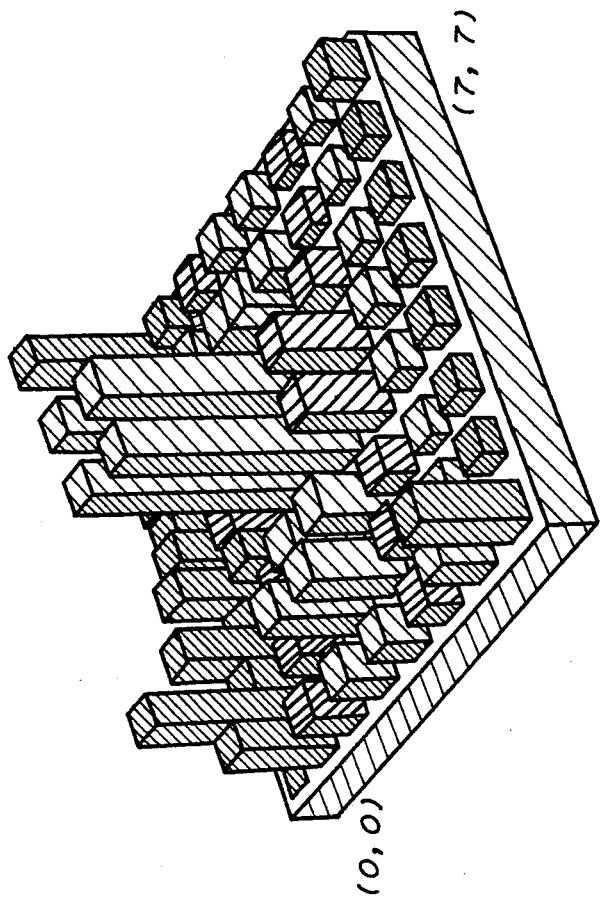
FIGS. 6A and 6B are illustrations for explaining a peak frequency component.
Figure 6A:
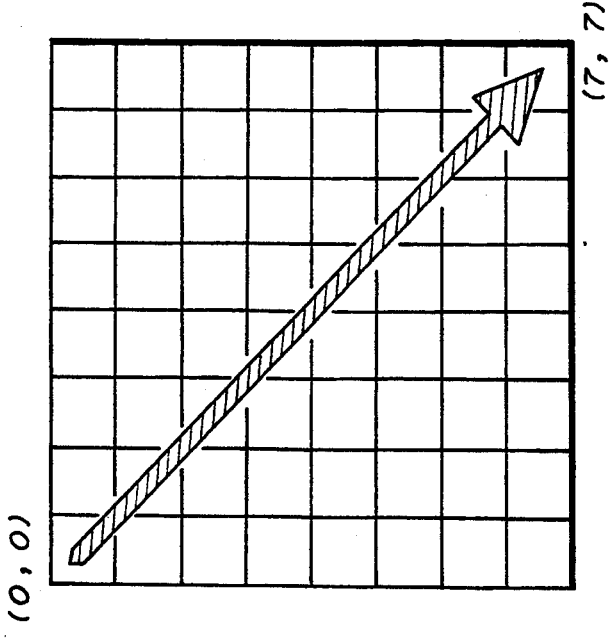

The determining unit 306 shown in FIG. 3 determines whether or not the block to be determined corresponds to a half tone area by detecting the characteristic frequency of a half tone from the DCT factor components $Y'_{uv}$. Since the half tone image comprises a plurality of dots uniformly arranged longitudinally and transversely in a small area, the value of a DCT factor component becomes large in a part where longitudinal and transverse intensity waveforms combine together. Practically, it has been found that a peak of the DCT factor components exist, as shown in FIG. 6A, in a position along a diagonal line, which extends from the low frequency part to the high frequency part of the DCT factor block. Specifically, the peak is as shown in FIG. 6B.

Figure 7B:
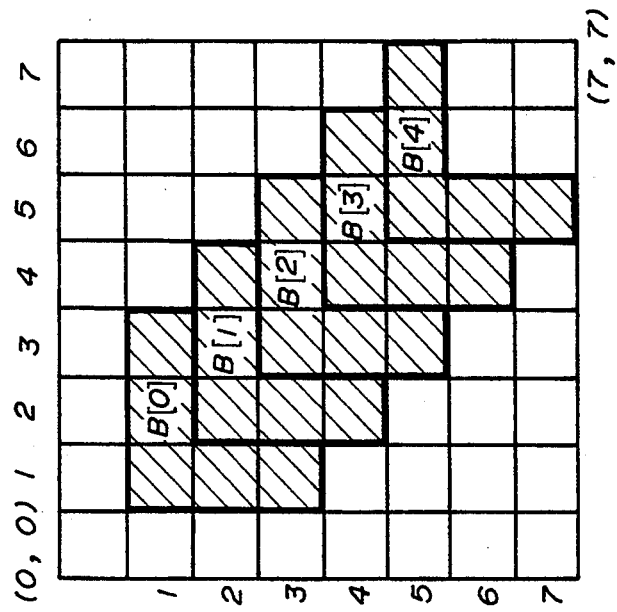
FIGS. 7A and 7B are illustrations for explaining comparison blocks.
Figure 7A:
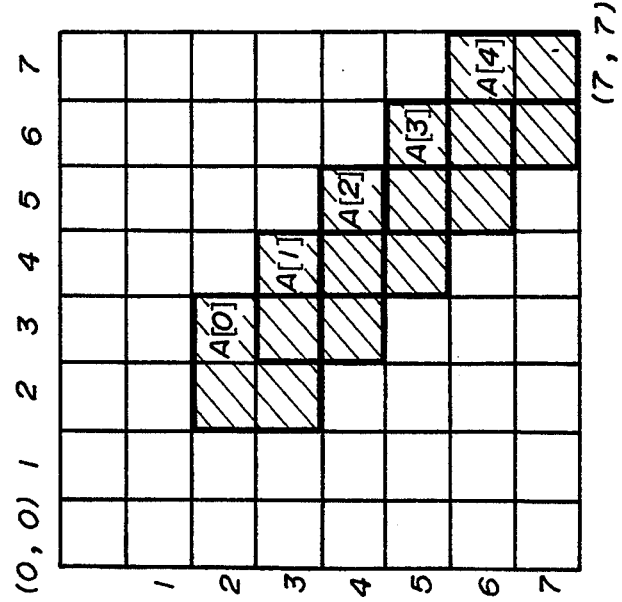

The determination performed by the determining unit 306 is described below with reference to FIGS. 7A and 7B. FIGS. 7A and 7B show the same block area.

In FIG. 7A, the mean value of the factor components (2, 2), (3, 2), (2, 3) and (3, 3) is designated as A[0]; the mean value of the factor components (3, 3), (4, 3), (3, 4) and (4, 4) is designated as A[1]; the mean value of the factor components (4, 4), (5, 4), (4, 5) and (5, 5) is designated as A[2]; the mean value of the factor components (5, 5), (6, 5), (5, 8) and (6, 6) is designated as A[3]; and the mean value of the factor components (6, 6), (7, 8), (6, 7) and (7, 7) is designated as A[4].

In FIG. 7B, the mean value of the factor components (1, 1), (2, 1), (3, 1), (1, 2) and (1, 3) is designated as B[0]; the mean value of the factor components (2, 2), (3, 2), (4, 2), (2, 3) and (2, 4) is designated as B[1]; the mean value of the factor components (3, 3), (4, 3), (5, 3), (3, 4) and (3, 5) is designated as B[2]; the mean value of the factor components (4, 4), (5, 4), (6, 4), (4, 5) and (4, 6) is designated as B[3]; and the mean value of the factor components (5, 5), (6, 5), (7, 5), (5, 6) and (5, 7) is designated as B[4].

The mean values A[i] and B[i] are compared with each other so as to determine whether or not A[i] is greater than B[i]. If A[i] is greater than B[i], it is determined that the peak exists on the diagonal line, and thereby the block being considered is determined to correspond to a half tone area.

However, in the above determination, an erroneous determination may occur due to small noise present in a flat part of the intensity waveform which flat part does not correspond to a half tone. That is, due to the small noise present in an area where value of the corresponding DCT factor $Y'_{uv}$ is very small, A[i] becomes greater than B[i], which results in an erroneous determination. In order to eliminate such an erroneous determination, the present embodiment uses a threshold value th1 obtained by experiment. That is, if both conditions, A[i]>B[i] and A[i]>th1, are satisfied, the block is determined to correspond to a half tone area. Accordingly, an erroneous determination is eliminated and thus the determining function is improved.

Figure 2:
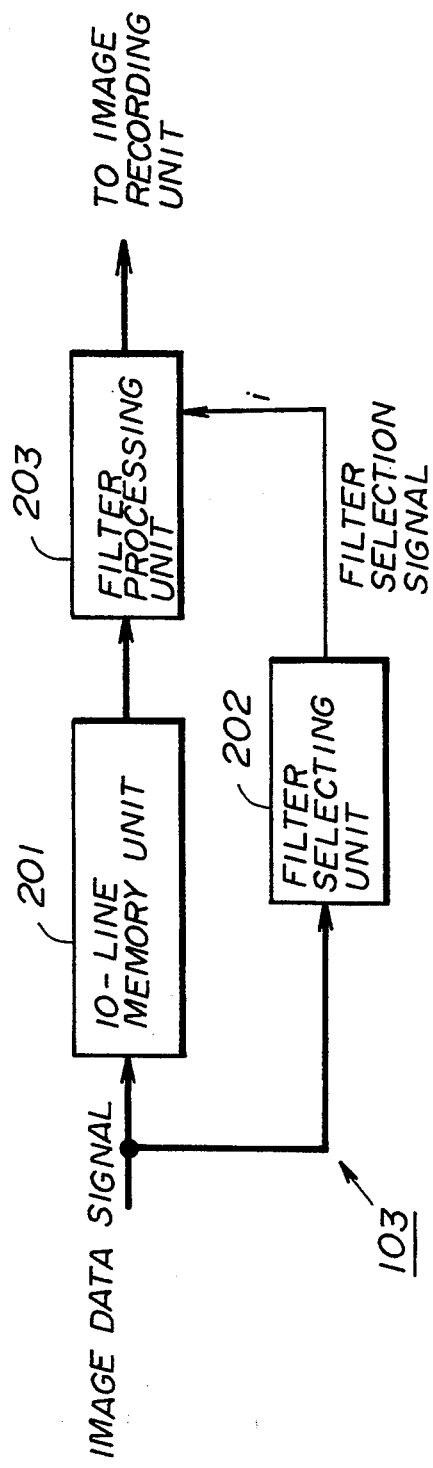
FIG. 2 is a block diagram of an image processing unit of FIG. 1.

The resultant data of the determination is stored in an 8-line buffer 307, and then output, as a filter selecting signal i, to the filter processing unit 203 shown in FIG. 2. That is, the filter selection of the filter processing unit 203 is performed in accordance with the number i of the above-mentioned mean value A[i] in a condition where A[i]>B[i] and A[i]>th1.

Since, as mentioned above, the DCT factor $Y_{uv}$ represents a ratio of frequency components included in the original image, it is considered that as the number i in A[i] becomes greater, the corresponding half tone area includes higher frequency of the intensity waveform. Therefore, by selecting a filter having a greater smoothing effect for a greater i value, higher frequency components can be suppressed.

FIGS. 8A to 8E show examples of five filters, in order of decreasing smoothing effect. The filter shown in FIG. 8A is selected for i=0; that shown in FIG. 8B for i=1; that shown in FIG. 8C for i=2; that shown in FIG. 8D for i=3; and that shown in FIG. 8E for i=4. It should be noted that in each of the filters shown in FIGS. 8A–8E, the pixels used in the processing are the 5*3 pixels surrounding and including the pixel to be processed. In the figures, the hatched area represents a pixel to be processed. The intensity value of each of pixels in the 5*3 pixel block is multiplied by the corresponding number in the figure, and then divided by the number which is the sum of all the numbers in the figure. The result becomes the intensity value of the processed pixel.

The selection signal i is stored in the 8-line buffer 307 shown in FIG. 3 for each pixel. When the block is determined not to correspond to a half tone area, a value "9" is written into the 8-line buffer 307 as a filter selection signal i. After filter selection signal for 8 lines are written in the 8-line buffer 307, the filter selection signals are output to the filter processing unit 203 in synchronization with the output of the pixel data stored in the 10-line memory unit 201. In the filter processing unit 203, each pixel is smoothed by switching to one of the filters to be used in accordance with the filter selection signal i of the corresponding pixel data supplied by the 10-line memory unit 201. When the signal i supplied by the filter selecting unit 202 is "9", smoothing is not applied to the corresponding pixel data because the pixel data has been determined as not corresponding to a half tone area.

According to the above-mentioned embodiment, only the data corresponding to a half tone area is smoothed and the smoothing effect is changed in response to the frequency components of the half tone area, and therefore an occurrence of moiré in a half tone area can be eliminated, and effects of the moiré eliminating process on an area which does not include a half tone can also be eliminated.

Although, in the above-mentioned embodiment, one of five filters can be selected in accordance with the value of the frequency components, the filter can be selected in accordance with a predetermined number of lines per mm for a half tone picture by using the following equation, which obtains a line number determining value k, together with a table shown in FIG. 9. The line number is the number of lines that consist of dots, included in a predetermined length (1 mm) of the original image.

$$k = \frac{A[i-1]*(i-1) + A[i]*i + A[i+1]*(i+1)}{A[i-1] + A[i] + A[i+1]}$$

The above equation is to calculate the deflection of a position of the peak frequency component in the block in accordance with values of A[i+1] and A[i−1]. The line number of a half tone area is determined by the table shown in FIG. 9 in accordance with the line number determining value k obtained with the above equation.

The values in the table of FIG. 9 were obtained from the line-number-determining value k in accordance with known line numbers of half tone pictures. A filter selection signal i, which is a value from "0" to "6", corresponding to the line number which is determined by the line number determining value k is written into the 8-line buffer 307. It should be noted that when the block is not determined to correspond to a half tone area, a value "9" is written into the 8-line buffer 307 as a filter selection signal i.

Similarly to the above-mentioned embodiment, after filter selection signals for 8 lines are written in the 8-line buffer 307, the filter selection signals are output to the filter processing unit 203 in synchronization with the output of the pixel data stored in the 10-line memory unit 201. In the filter processing unit 203, each pixel is smoothed by switching to one of filters (the example shown in FIG. 9 has seven filters) to be used in accordance with the filter selection signal i of the corresponding pixel data supplied by the 10-line memory unit 201. When the signal i supplied by the filter selecting unit 202 is "9", smoothing is not applied to the corresponding pixel data because the pixel data has been determined as not corresponding to a half tone area.

Therefore, similarly to the above embodiment, since the filter can be switched for each line number in accordance with the line number determining value, an occurrence of moiré in a half tone area can be further eliminated, and effects of the moiré eliminating process on an area which does not include a half tone can also be eliminated.

In the above-mentioned method, since switching of the filter is made for each block, block noise may be generated, when each of two adjacent blocks is processed with a different filter, in the border between the two blocks. Since most images in a single original use one kind of line number, this block noise can be eliminated by repeatedly selecting the same filter. An example is described below.

Figure 10:
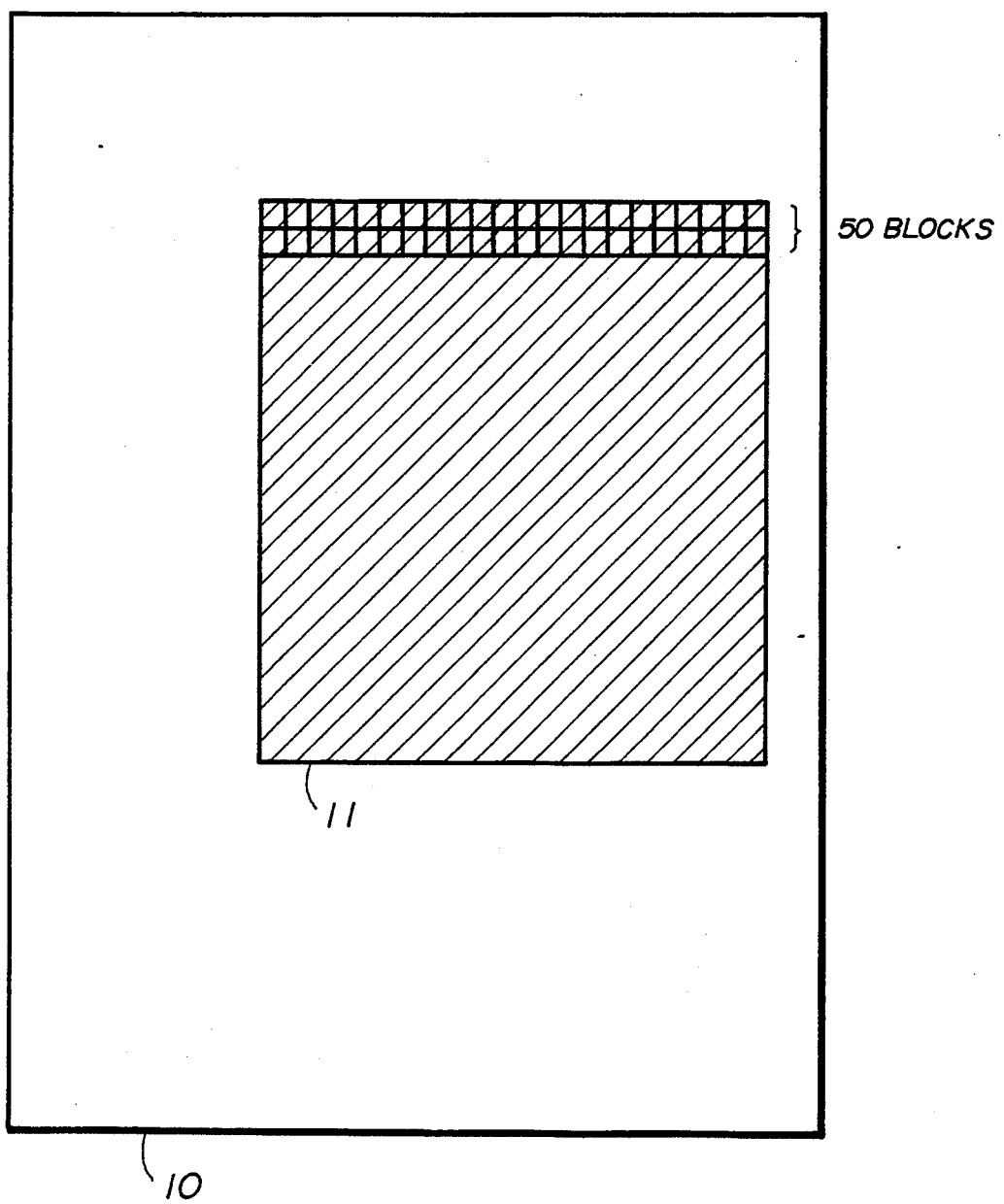
FIG. 10 is an illustration for explaining a first block of a half tone area in another variation of the first embodiment.

FIG. 10 shows a single original sheet having a half tone image. As shown in the figure, the line number determining value k is obtained for the first 50 blocks in the half tone area is 11. In this example, the filter is fixed to be one particular filter based on the result of the selected filter for the first 50 blocks.

Figure 11:
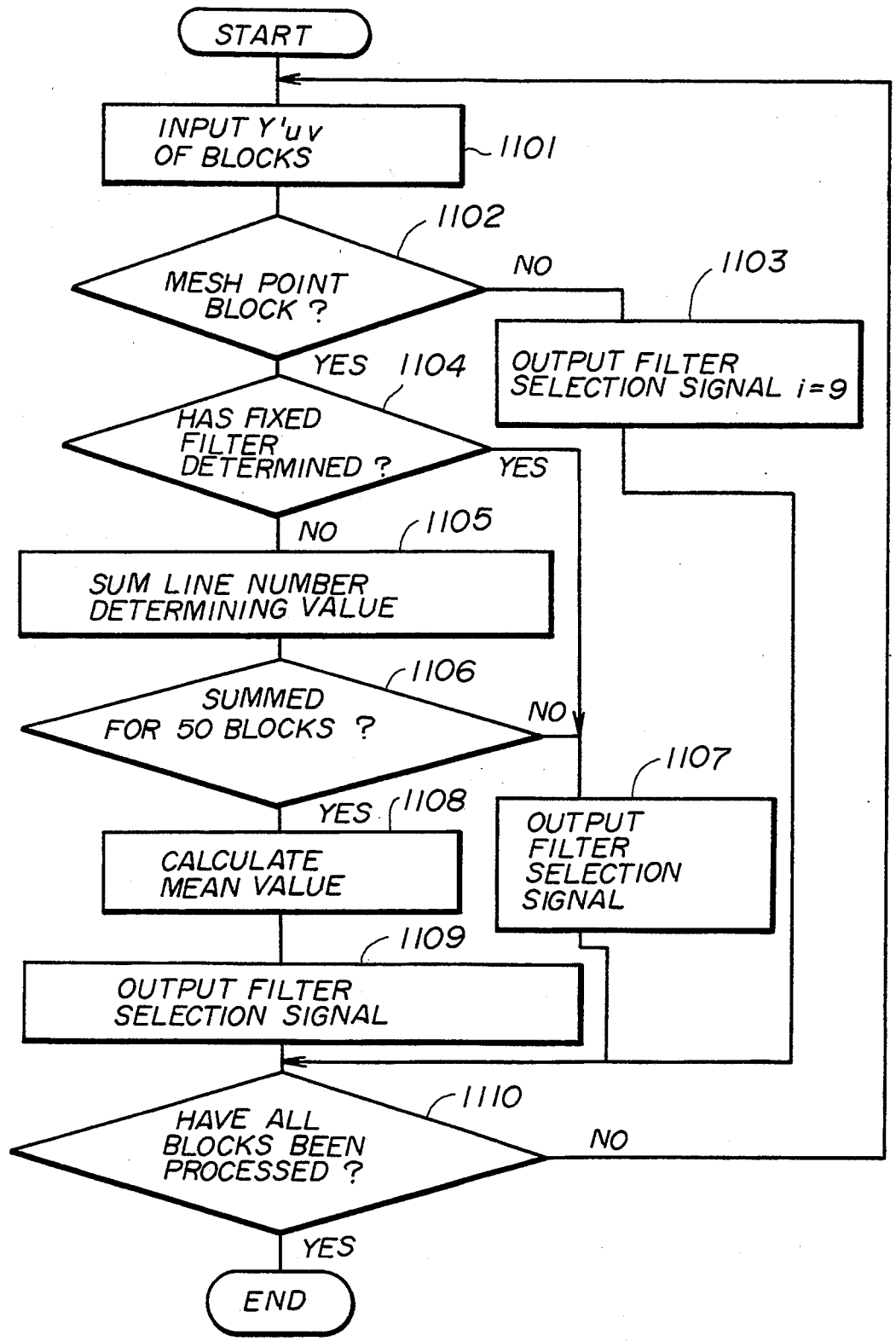
FIG. 11 is a flow chart of an operation of the variation of FIG. 10.

A description will now be given, with reference to FIG. 11, of an operation performed by the determining unit 306 for this example. When the mean value $Y'_{uv}$ of the absolute values of the DCT factors of surrounding blocks is supplied, in step 1101, to the determining unit 306 from the mean value processing unit 305, it is determined, in step 1102, whether or not the block being considered corresponds to a half tone area. If it is judged that the block does not correspond to a half tone area, the routine proceeds to step 1103 where the determining unit 306 outputs filter selection signal i=9, and then the routine proceeds to step 1110.

If it is determined, in step 1102, that the block comprises a half tone, it is determined, in step 1104, whether or not a fixed filter has been determined. If a fixed filter has already been determined, the routine proceeds to step 1107 where the determining unit 307 outputs the filter selection signal i, and then the routine proceeds to step 1110.

If it is determined, in step 1104, that a fixed filter has not been determined yet, the routine proceeds to step 1105 to sum the line number determining value k, and then the routine proceeds to step 1106. In step 1108, it is determined whether or not the line number determining values for 50 blocks have been summed. If it is determined that line number determining values for 50 blocks have not been summed, the routine proceeds to step 1107 where the determining unit 306 outputs the filter selection signal i, and the routine proceeds to step 1110.

If it is determined that line number determining values for 50 blocks have been summed, the routine proceeds to step 1108 where the mean value of the summed values k is calculated, and then the routine proceeds to step 1109. In step 1109, the filter selection signal is determined in accordance with the table shown in FIG. 9, and the determined value is output as a filter selection signal i.

In step 1110, it is determined whether or not all blocks included in the original sheet have been processed. If not all the blocks have been processed, the routine returns to step 1101. If it is determined, in step 1110, that all the blocks have been processed, the routine ends.

In the above-mentioned operation, one filter is determined in accordance with the line number determining value for the first 50 blocks, and the determined filter is used for the rest of the consecutive blocks corresponding to the half tone area 11. Therefore, a single filter is used for a single half tone area, that is, there is no filter switch for a single half tone area. Accordingly, the block noise, which occurs due to filter switching, can be eliminated.

A description will now be given, with reference to FIGS. 12 and 13, of a second embodiment according to the present invention. The second embodiment can eliminate an erroneous determination which may occur at an edge of a character.

Figure 12:
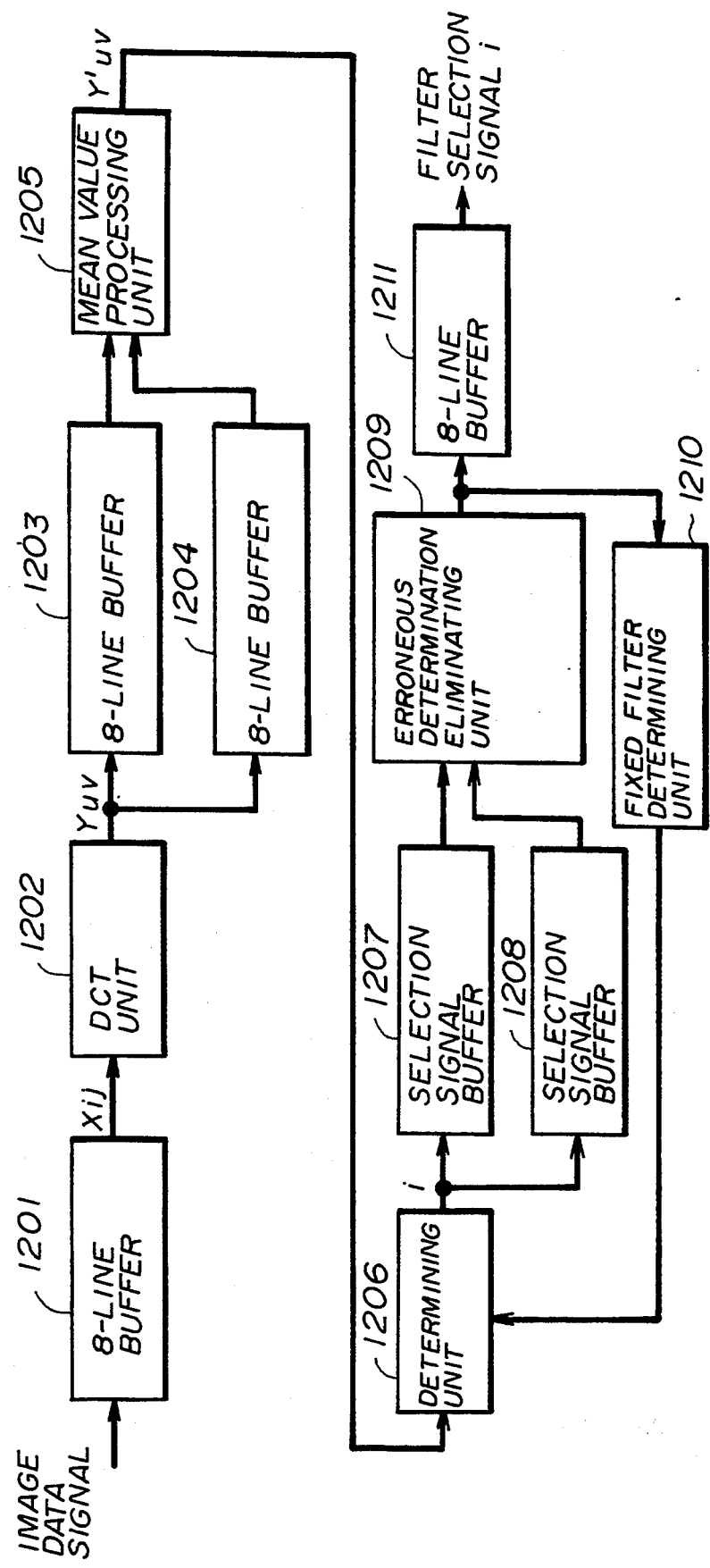
FIG. 12 is a block diagram of a filter selecting unit of a second embodiment according to the present invention.
Figure 13:
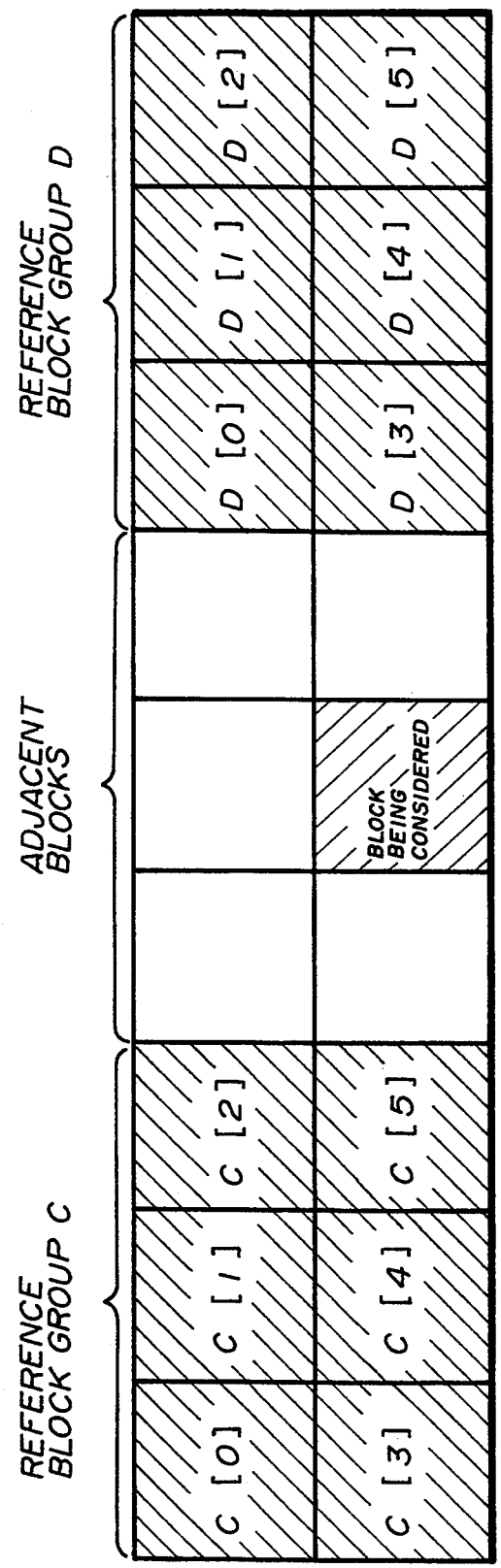
FIG. 13 is an illustration for explaining an operation of an erroneous determination eliminating unit.

Referring to FIG. 12, since the parts from 8-line buffer 1201 to mean value processing unit 1205 are the same as parts 301 to 305 shown in FIG. 3, respectively, descriptions thereof will be omitted.

A determining unit 1206 calculates, when the mean value of absolute values of the DCT factors of the surrounding blocks is supplied, a line number determining value k, and determines a filter selection signal i for each block. The filter selection signal i is alternately stored in selection signal buffers 1207 and 1208 for each 8 lines.

In this embodiment, after selection signals i for 8 lines, which corresponds to the number of lines included in the block, are stored in either selection signal buffer 1207 or 1208, and when a block in reference block groups C or D is determined as not corresponding to a half tone area, an erroneous determination eliminating unit 1209 sets the corresponding element of C[j] or D[j] to 1 (j=0 to K−1; K is the number of blocks in the reference block group C or D); otherwise it is set to 0.

If a sum S of C[j] and D[j] is greater than a threshold value th2, which is determined by experiment, and both the sum of C[j] and the sum of D[j] are not equal to 0, the block is determined as not correspond to a half tone area, that is, the selection signal i is set to 9. Otherwise, the selection signal is not changed. That is, in this embodiment, by utilizing the property of original image that a half tone area does not exist alone, an erroneous determination of a half tone area is eliminated by using the reference block groups C and D which are adjacent to the block group including the block being considered.

The erroneous determination eliminating unit 1209 sends to an 8-line buffer memory 1211 the filter selection signals i corresponding to the pixels in the block being considered, and also sends the filter selection signals to a fixed filter determining unit 1210. The fixed filter determining unit 1210 statistically analyzes the filter selection signals i for 50 blocks, except for signals having a value of 9 (i=9), so as to determine which signal i occurs predominantly among them. The predominant signal i is supplied to the determining unit 1206.

When the filter selection signals i for 8 lines have been stored in the 8-line buffer memory 1211, the filter selection signals i are output to the filter processing unit 203 in synchronization with the outputting of the pixel data stored in the 10-line memory unit 201 shown in FIG. 2. The filter processing unit 203 processes the pixel data, which is supplied from 10-line memory unit 201 and corresponds to a half tone area, by switching the filters in accordance with the filter selection signal 1. Smoothing is not applied to pixel data which does not correspond to a half tone area.

According to the second embodiment; since an area erroneously determined, by the determining unit 1206, as corresponding to a half tone area can be eliminated by the erroneous determination eliminating unit 1209, only the data corresponding to a half tone area is smoothed and the smoothing effect is changed in response to the frequency components of the half tone area. Therefore, occurrence of moiré in a half tone area can be eliminated, and effects of the moiré eliminating process on an area which does not include a half tone can be also eliminated.

The present invention is not limited to the specifically disclosed embodiments, and variations and modifications may be made without departing from the scope of the present invention.

What is claimed is:

1. An image processing apparatus which processes pixel data obtained from an original containing a half tone image, comprising:
   a) data block preparing means for preparing a plurality of data blocks which each include N*N pixel data obtained by scanning of said original;
   b) smoothing means, including a plurality of filters, for smoothing said pixel data by using one of said plurality of filters;
   c) transformation means for transforming each of said data blocks by means of a two-dimensional orthogonal transform so as to obtain a transformation factor block corresponding to each of said data blocks formed as an N*N matrix;
   d) evaluation block preparing means for preparing an evaluation block including N*N transformation factors each of which transformation factors is a mean value of absolute values of corresponding transformation factors from a data block being considered and data blocks surrounding said data block being considered;
   e) mean value calculating means for calculating mean values A[i] and B[i] (i=0 to L−1) of predetermined transformation factors in said evaluation block, wherein:
      1) said mean values A[i] are calculated to be mean values of transformation factors included in L first areas, the L first areas being consecutively positioned along a diagonal line of said evaluation block extending from lower factors to higher factors, and
      2) said mean values B[i] are calculated to be mean values of transformation factors included in L second areas, the L second areas being positioned adjacent to and lower in frequency to the corresponding first areas;
   f) filter selection signal generating means for generating a filter selection signal which corresponds to the number i when two conditions are satisfied, the two conditions being:
      1) said mean value A[i] is greater than B[i] and
      2) said mean value A[i] is greater than a predetermined threshold value th1; and
   g) filter selection means for selecting one of said filters in said smoothing means in accordance with said filter selection signal supplied by said filter selection signal generating means so that the pixel data corresponding to said evaluation block is smoothed by the selected filter.

2. The image processing apparatus as claimed in claim 1, wherein said filter selection signal generating means generates a signal having a value which corresponds to a predetermined value other than numbers 0 to L when said condition for A[i] is not satisfied, and said smoothing means does not smooth the pixel data corresponding to said evaluation block when said filter selection signal is at said predetermined value.

3. The image processing apparatus as claimed in claim 2, further comprising:
   reference block group preparing means for preparing first and second reference data block groups adjacent to a third data block group including a block being considered in a center thereof;
   wherein:
   said first data block group includes K blocks and is positioned on a right side of said third data block group,
   said second data block group includes K blocks and is on a left side of said third data block group;
   said filter selection signal generating means includes means for generating said predetermined value other than 0 to L when a sum of C[j] and D[j] is greater than a predetermined threshold value th2 and neither the sum of C[j] nor the sum of D[j ] are equal to 0,
   C[j] (j=0 to K−1) is a value corresponding to each block in said first block group,
   D[j] (j=0 to K−1) is a value corresponding to each block in said second block group,
   a value of said C[j] and D[j] is set to 1 when said filter selection signal generating means generates a signal the value of which corresponds to said predetermined value other than the numbers 0 to L, and
   a value of said C[j] and D[j] is set to 0 when said filter selection signal generating means generates a signal the value of which corresponds to the number i.

4. The image processing apparatus as claimed in claim 1, wherein said filter selection signal generating means generates a filter selection signal when a condition is satisfied where said mean value A[i] is greater than B[i] and is greater than a predetermined threshold value th1, said filter selection signal being generated by selecting a value from predetermined first values corresponding to said filters, respectively, in accordance with a second value obtained based on values A[i−1], A[i] and A[i+1].

5. The image processing apparatus as claimed in claim 4, wherein said filter selection signal generating means generates a signal having a value which corresponds to a predetermined third value other than said predetermined first values when said condition for A[i] is not satisfied, and said smoothing means does not smooth the pixel data corresponding to said evaluation block when said filter selection signal is at said predetermined third value.

6. The image processing apparatus as claimed in claim 4, wherein said second value is obtained from the following equation, where k is the second value:

$$k = \frac{A[i-1]*(i-1) + A[i]*i + A[i+1]*(i+1)}{A[i-1] + A[i] + A[i+1]}.$$

7. The image processing apparatus as claimed in claim 1, further comprising fixed filter selection signal generating means for generating a fixed filter selection signal, said fixed filter selection signal being determined in accordance with the mean value of A[i] of a predetermined number of blocks after said condition for A[i] is satisfied, said fixed filter selection signal being generated instead of said filter selection signal until said condition for A[i] is no longer established.

8. The image processing apparatus as claimed in claim 1, wherein said mean value calculating means includes:
  means for determining the mean values A[i] and B[i] to be, respectively:
   A) mean values of transformation factors in L first square-shaped areas consecutively positioned along the diagonal line of said evaluation block extending from lower factors to higher factors, and
   B) mean values of transformation factors in L second areas which are positioned above and/or to the left of respective corresponding first areas.

9. The image processing apparatus as claimed in claim 1, wherein the mean value calculating means includes: means for determining the mean values A[i] and B[i] to be, respectively:
  A) mean values of transformation factors in L first square-shaped 2*2 areas consecutively positioned along the diagonal line of said evaluation block extending from lower factors to higher factors, and
  B) mean values of transformation factors in L second five-transformation-factor value areas, each of the five-transformation-factor value areas including:
   1) two pixels positioned immediately above (at a lower frequency than) a respective corresponding first area,
   2) two pixels positioned immediately to the left of (at a lower frequency than) the respective corresponding first area, and
   3) one pixel positioned immediately above and to the left of (at a lower frequency than) the respective corresponding first area.

* * * * *